United States Patent
Irgang et al.

(10) Patent No.: US 10,464,472 B2
(45) Date of Patent: Nov. 5, 2019

(54) ILLUMINATION ASSEMBLY FOR A VEHICLE

(71) Applicant: Rebo Lighting & Electronics, LLC, Ann Arbor, MI (US)

(72) Inventors: Todd Irgang, Saline, MI (US); Orin Lenz, Canton, MI (US); Jon Beattie, Trenton, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 21 days.

(21) Appl. No.: 15/356,011

(22) Filed: Nov. 18, 2016

(65) Prior Publication Data

US 2018/0141483 A1     May 24, 2018

(51) Int. Cl.
*B60Q 1/22* (2006.01)
*B60Q 1/56* (2006.01)
(Continued)

(52) U.S. Cl.
CPC ............ *B60Q 1/22* (2013.01); *B60Q 1/2607* (2013.01); *B60Q 1/56* (2013.01); *B60R 1/00* (2013.01);
(Continued)

(58) Field of Classification Search
CPC .... B60Q 1/22; B60Q 1/56; B60R 1/00; B60R 2300/103; B60R 2300/8066; F21S 43/14; F21S 43/31; F21S 43/20; F21S 43/235; F21S 43/30; F21S 43/315; F21S 43/195; F21S 48/212; F21S 48/215; F21S 48/234; F21S 48/236
See application file for complete search history.

(56) References Cited

U.S. PATENT DOCUMENTS

| | | | |
|---|---|---|---|
| 6,471,379 B2 * | 10/2002 | Bucher | B60Q 1/56 362/497 |
| 6,607,286 B2 | 8/2003 | West | |
| 7,134,768 B2 * | 11/2006 | Suzuki | B60Q 1/0052 362/241 |
| 7,221,845 B2 * | 5/2007 | Steenblik | B29D 11/00663 385/131 |

(Continued)

FOREIGN PATENT DOCUMENTS

| | | |
|---|---|---|
| KR | 2020110000523 U | 1/2011 |
| KR | 2020130000244 U | 1/2013 |

OTHER PUBLICATIONS

International Search Report issued for PCT application PCT/US2017/062355, dated Mar. 30, 2018.

(Continued)

*Primary Examiner* — Anh T Mai
*Assistant Examiner* — Arman B Fallahkhair
(74) *Attorney, Agent, or Firm* — Reising Ethington, P.C.

(57) ABSTRACT

An illumination assembly for a vehicle that includes a housing, a light source, and an illumination device with an optical body. The optical body includes: a first major surface; a second major surface; an edge surface; a first reflective feature that includes a recess with side walls; and a second reflective feature that includes a curved reflector. The light source is mounted adjacent the first major surface so as to oppose the first reflective feature. In operation, light emitted from the light source enters the optical body at the first major surface, reflects off of the first and second reflective features, and exits the optical body at the edge surface so as to illuminate an area of interest behind the vehicle.

18 Claims, 4 Drawing Sheets

(51) Int. Cl.
*F21S 43/14* (2018.01)
*F21S 43/31* (2018.01)
*F21S 43/19* (2018.01)
*B60R 1/00* (2006.01)
*B60Q 1/26* (2006.01)
*F21S 43/20* (2018.01)
*F21S 43/239* (2018.01)
*F21S 43/243* (2018.01)
*F21S 43/245* (2018.01)
*F21S 43/249* (2018.01)
*F21V 8/00* (2006.01)

(52) U.S. Cl.
CPC ............... *F21S 43/14* (2018.01); *F21S 43/19* (2018.01); *F21S 43/195* (2018.01); *F21S 43/239* (2018.01); *F21S 43/243* (2018.01); *F21S 43/245* (2018.01); *F21S 43/249* (2018.01); *F21S 43/26* (2018.01); *F21S 43/31* (2018.01); *F21S 43/315* (2018.01); *G02B 6/002* (2013.01); *G02B 6/0038* (2013.01); *B60R 2300/103* (2013.01); *B60R 2300/8066* (2013.01)

(56) References Cited

U.S. PATENT DOCUMENTS

| | | | |
|---|---|---|---|
| 7,703,973 B2 | 4/2010 | Zhu | |
| 7,905,611 B1 | 3/2011 | Bourget | |
| 8,248,556 B2 | 8/2012 | Larson | |
| 8,297,786 B2* | 10/2012 | Shani | G02B 5/021 |
| | | | 362/247 |
| 8,851,712 B2 | 10/2014 | Shani | |
| 9,377,170 B2* | 6/2016 | Gebauer | F21S 48/225 |
| 9,669,754 B2* | 6/2017 | Tatara | B60R 11/04 |
| 9,732,938 B2* | 8/2017 | Morgan | F21V 7/04 |
| 2002/0071272 A1 | 6/2002 | Tenmyo | |
| 2004/0189168 A1 | 9/2004 | Tenmyo | |
| 2006/0268564 A1* | 11/2006 | Ruiz | B60Q 1/00 |
| | | | 362/511 |
| 2009/0196059 A1 | 8/2009 | Koizumi | |
| 2012/0328242 A1 | 12/2012 | Hesse | |
| 2014/0293582 A1 | 10/2014 | Lee | |

OTHER PUBLICATIONS

International Preliminary Report on Patentability issued for PCT application PCT/US2017/062355, dated May 31, 2019.

* cited by examiner

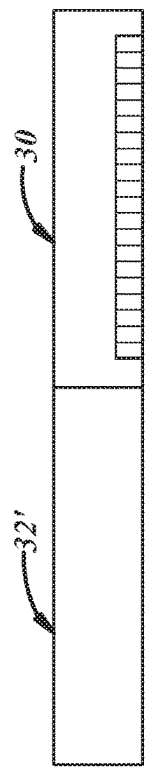
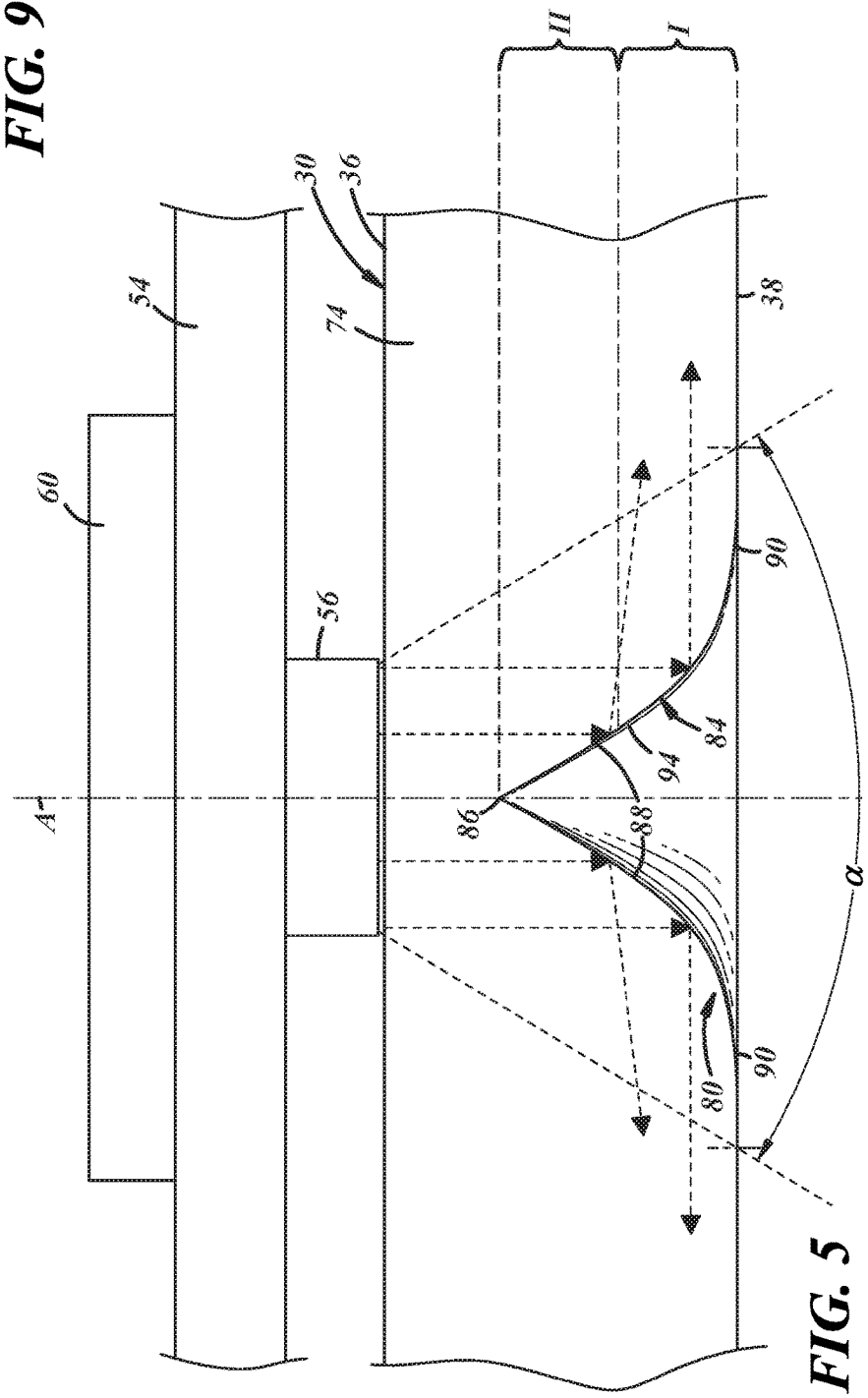

ILLUMINATION ASSEMBLY FOR A VEHICLE

FIELD

The present disclosure relates to an illumination assembly for a vehicle and, more particularly, to an illumination assembly that may be used in interior or exterior vehicle lighting applications, such as with vehicle backup cameras.

BACKGROUND

Rearward facing or so-called 'backup cameras' are already provided on many new vehicles and soon may be a requirement for new vehicles in certain areas. The quality of data or an image captured by such cameras can vary depending on a number of factors, including the amount of light present. For example, the data or image quality exhibited by the camera in low light conditions may be poor, even though the camera has a detector or an imager with a reasonably high sensitivity.

Thus, in the example of a backup camera, it can be desirable to improve the performance of the camera by better illuminating a region of interest behind the vehicle so that the camera gathers more light and consequently improves the quality of the data or image being gathered.

SUMMARY

According to one embodiment of the invention, there is provided an illumination assembly that includes a housing, a light source, and an illumination device. The illumination device may include an optical body that is made of optically transparent material and includes: a first major surface; a second major surface that is separated from the first major surface by a thickness of the optical body; an edge surface that extends between the first and second major surfaces; a first reflective feature that includes a recess with side walls surrounded by an outer boundary, the first reflective feature extends from at least one of the first and second major surfaces into the thickness of the optical body; and a second reflective feature that includes a curved reflector, the curved reflector is located between the first and second major surfaces in the thickness of the optical body. The illumination assembly may be arranged so that light emitted from the light source enters the optical body at the first major surface, reflects off of at least one of the first and second reflective features, and exits the optical body at the edge surface.

DRAWINGS

Preferred exemplary embodiments will hereinafter be described in conjunction with the appended drawings, wherein like designations denote like elements, and wherein:

FIG. 5 is a partial sectional view of one of the illumination devices shown in FIG. 3 along section lines 5-5 and also includes a partial sectional view of the circuit card assembly shown in FIG. 2;

FIG. 9 is a front view of another embodiment of the illumination devices.

DESCRIPTION

Figure 1:
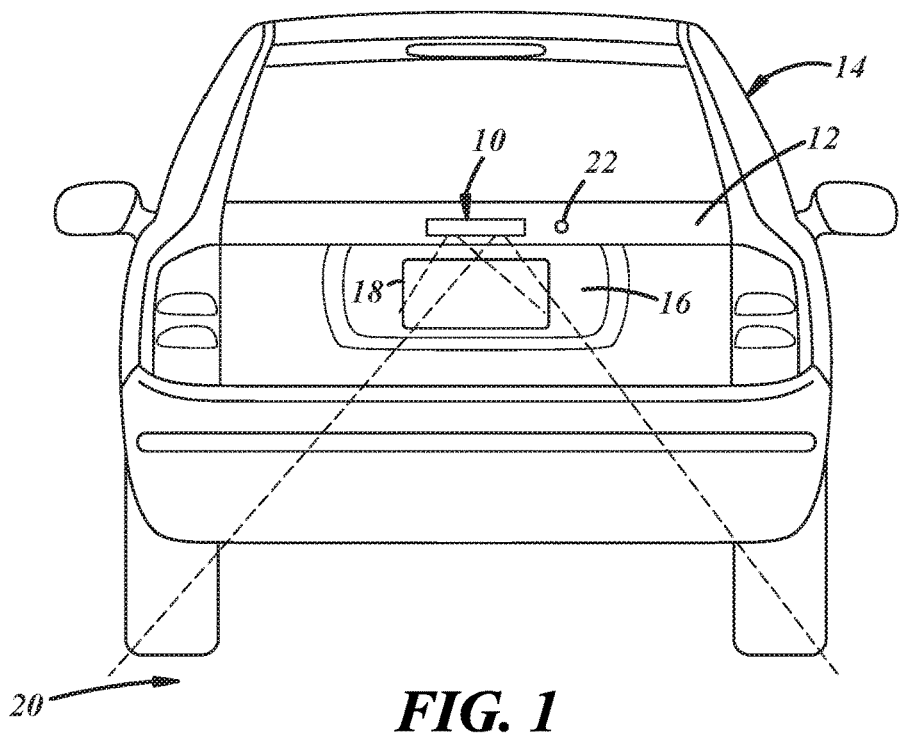
FIG. 1 is a rear view of a vehicle having an embodiment of an illumination assembly installed therein.

An illumination assembly 10 is described that may be used in a variety of automotive and non-automotive lighting implementations. FIG. 1 illustrates one such implementation, where the illumination assembly 10 is mounted in a rear body panel 12 of a vehicle 14 above a license plate region 16. In this implementation, the illumination assembly 10 may be used to illuminate a nearby vehicle license plate 18, as well as a region of interest 20 behind the vehicle so as to provide additional light for a backup camera 22. As explained above, additional light from the illumination assembly 10 may enhance rear facing visibility for a driver of the vehicle by increasing the data or image quality of the backup camera 22, particularly when it is operating in low light conditions.

Figure 2:
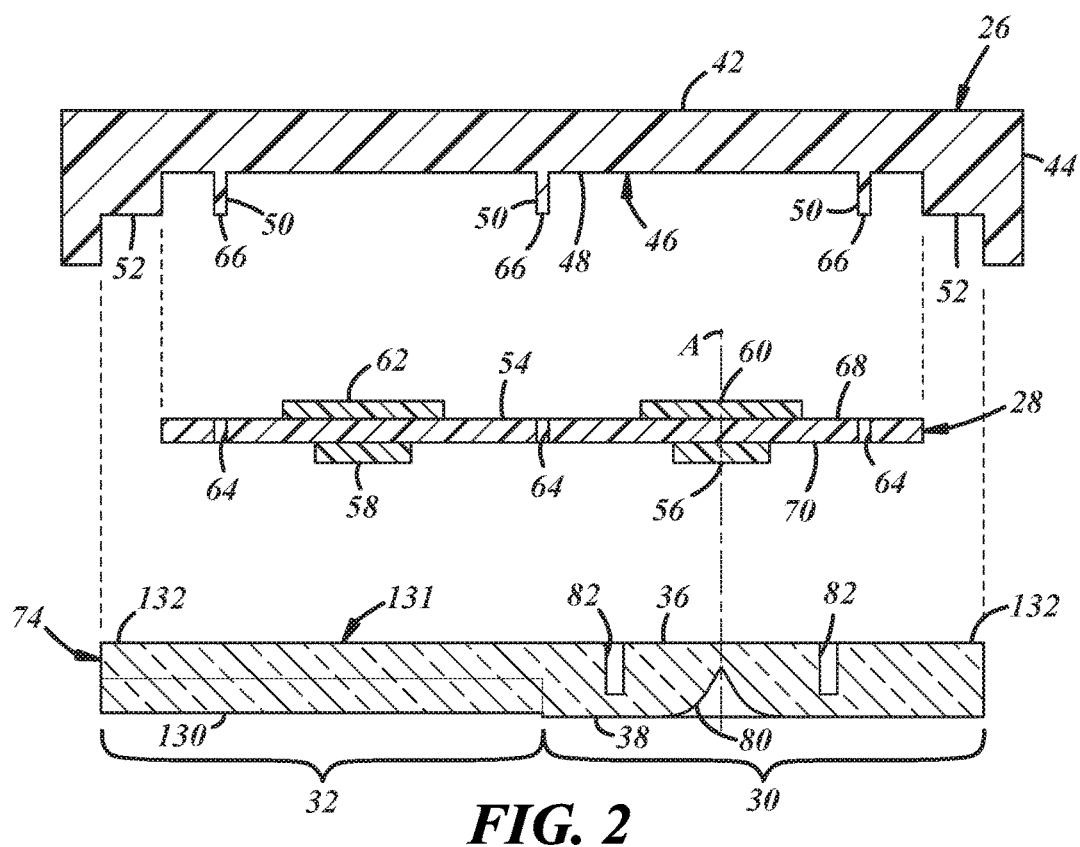
FIG. 2 is an exploded, sectional view of the illumination assembly of FIG. 1 and includes embodiments of a housing, a circuit card assembly, and two illumination devices.

FIGS. 2-6 illustrate an embodiment of the illumination assembly 10 in greater detail. For example, FIG. 2 illustrates an exploded, sectional view of the assembly 10 having a housing 26, a circuit card assembly 28, a first illumination device 30, and a second illumination device 32. In the illustrated embodiment, the devices 30, 32 are formed using a single unitary piece of optically transparent or waveguide material and share a first or upper major surface 36 which is positioned to receive light from the circuit card assembly 28. As will be explained in greater detail below, some of the light received via the upper major surface 36 may be internally reflected or redirected within illumination device 30 so that the light exits through a minor surface 40 (e.g., through an edge surface 40E) and illuminates the region of interest 20 behind the vehicle, whereas some of the light received via the upper major surface 36 may be internally reflected or redirected so as to exit a second or lower major surface 38 to illuminate the vehicle license plate. In this way, the illumination assembly 10 receives light at an upper major surface 36 and distributes some of that light for emission out of a minor or edge surface 40 and some of that light for emission out of an opposite major surface 38.

It should be appreciated that terms of relative direction and position such as "upper," "lower," "front," "rear," "above," "below," and the like are used only for explanatory purposes and are not intended to be limiting. Further, the illumination assembly 10 described herein is associated with an exterior automotive environment; however, it will be appreciated that it also could be used in an interior automotive environment, a non-automotive environment (e.g., such as within a building interior, on a tool or equipment, on an aircraft, boat, etc.), or in some other suitable application. Furthermore, the illumination assembly 10 is described herein with dual functionality (i.e., illuminating both a license plate and a region of interest behind the vehicle), but it should be appreciated that the illumination device could be adapted to carry out a single illumination function, to carry out additional illumination functions, or to carry out different illumination functions, to cite a few possibilities.

As shown in FIG. 2, housing 26 includes a base 42 and a skirt 44 that extends axially from the base to form a cavity 46 sized to receive the circuit card assembly 28 and illumination devices 30, 32. An inner surface 48 of the base 42 may have one or more retaining rods or stakes 50 which extend axially away from the surface 48 for retaining or positioning the circuit card assembly 28. And the skirt 44 may include a counterbore or circumferential lip 52 that is sized to receive the illumination devices 30, 32 and that can be used to form a seal between the housing 26 and the illumination devices 30, 32 to protect the circuit card assembly 28 and its components from moisture, dirt, debris, etc., as explained below. The housing 26 may have other features as well; e.g., it may have an electrical connector or mounting features or appurtenances (not shown). In addition, the housing 26 may be formed in a single unitary piece (e.g., it may be formed in a mold using plastic, metal, or any other suitable material). It should be appreciated that the illumination devices 30, 32 and circuit card assembly 28 could be used without the housing 26 in at least one embodiment; thus, the illustrated housing 26 is optional and not required.

The circuit card assembly 28 may include a printed circuit board (PCB) 54, one or more light sources 56, 58, and one or more driver circuits 60, 62 for respectively controlling light sources 56, 58. The PCB 54 may include wires or traces (not shown) for interconnecting the driver circuits 60, 62 and other electrical components (as is well known in the art). In at least one embodiment, the PCB 54 may have through holes 64 which correspond with the retaining rods or stakes 50 in the housing 26. In this manner, when the circuit card assembly 28 is located within the housing 26, the stakes 50 can be positioned within the holes 64. The circuit card assembly 28 may be retained within the housing 26 by soldering or welding the stakes 50 to the PCB 54. For example, according to one illustrative method, the tips 66 of the stakes 50 are heated momentarily so that the tips melt over a local region of the PCB 54 to retain the PCB relative to the housing 26.

In the illustrated embodiment, the two driver circuits 60, 62 are shown mounted on a first or upper side 68 of the PCB 54, and the two light sources 56, 58 (e.g., light emitting diodes or LEDs) are shown mounted on a second or lower side 70 of the PCB 54 and electronically coupled to the driver circuits 60, 62. As will be explained in greater detail below, by locating only relatively small components (e.g., only the LEDs 56, 58) on the lower side 70 of the PCB 54, the LEDs may be positioned adjacent to or relatively close to the upper major surface 36 of the illumination devices 30, 32 (which may improve light transmission performance). Any suitable LEDs 56, 58 may be used; however, in a non-limiting embodiment, the LEDs may have a width of approximately 1-1.5 millimeters and may provide light having a color temperature (electromagnetic radiation) in the range of 2,700 K-12,000 K (e.g., LEDs having color temperatures within this range may improve total internal reflectance, which is desirable, as discussed below). The driver circuits 60, 62 may include any suitable electronics for actuation/de-actuation, overvoltage protection, etc., and light sources 56, 58 other than LEDs could be used in other embodiments. Further, the electronics carried by the PCB 54 may be coupled to an electrical harness (not shown) which may be interconnected with a power source and controller (e.g., located elsewhere on vehicle 14), as is understood by those skilled in the art.

According to one embodiment, the illumination devices 30, 32 act as a waveguide and include an optical body 74 made of optically transparent material such as acrylic (e.g., poly(methyl methacrylate) or PMMA), polycarbonate, or any other suitable plastic. In at least one embodiment, the optical body 74 is formed in a mold having a generally parallelepiped (e.g., a rectangular parallelepiped) shape such that the major surfaces 36, 38 are generally parallel to one another and the opposite minor or edge surfaces 40 (which extend between the upper and lower surfaces) are generally parallel to one another. According to one implementation, the thickness of the optical body 74 (or spacing between the upper and lower major surfaces 36, 38) may be 3-5 millimeters; of course, this is merely one implementation, and in other implementations, the shape and/or thickness may be different. Although the illumination devices are described herein as being part of one integrally formed component, with the first illumination device 30 shown on the right and the second illumination device 32 formed on the left, it is certainly possible for these two devices to be formed, manufactured, mounted and/or otherwise located separately so that they are not made from a unitary piece of optically transparent material.

Figure 3:
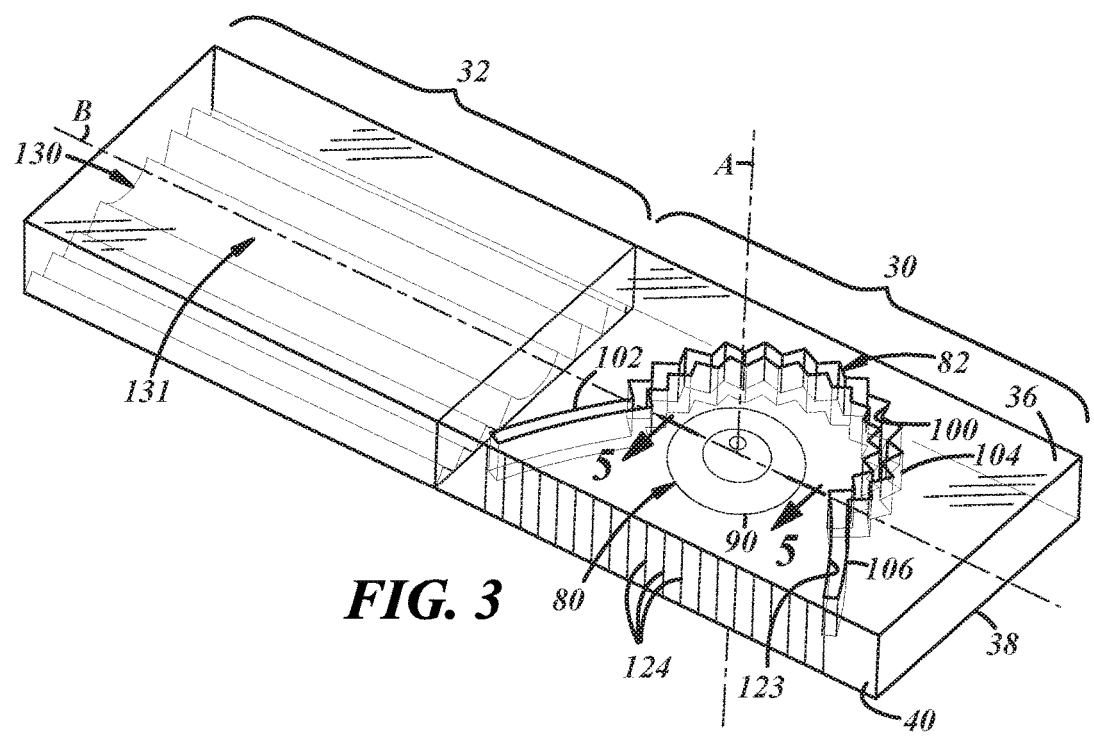
FIG. 3 is a perspective top view of the illumination devices shown in FIG. 2.
Figure 4:
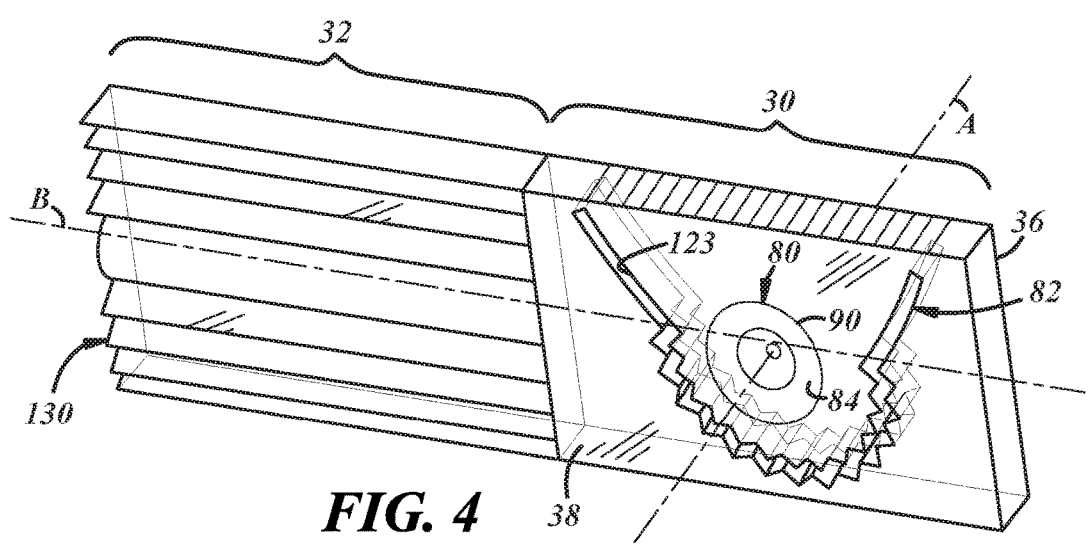
FIG. 4 is a perspective bottom view of the illumination devices shown in FIG. 2.

Turning now to FIGS. 3-5, a portion of the optical body 74 corresponding to the first illumination device 30—which is adapted to illuminate the region of interest 20 located behind the vehicle 14—may have first and second reflective features 80, 82 that are molded, etched, machined and/or otherwise formed into the optical body 74. More particularly, the first and second reflective features 80, 82 are adapted to internally reflect light rays received from light source 56 within the optical body 74 (e.g., ideally achieving total internal reflectance) so that the light can ultimately be directed out of the minor surface 40 (i.e., the edge surface) and illuminate the desired region. As discussed herein, total internal reflectance (or the degree thereof) can be dependent upon several factors, including the angles of incident light and the optical properties or characteristics of the mediums involved.

The first reflective feature 80 is a recess 84 that is formed in the lower major surface 38 of the first illumination device 30 and is designed to receive light from the first light source 56 and to distribute it within the optical body 74 towards the second reflective feature 82. According to one non-limiting example, the first reflective feature 80 is a recess that is molded into the lower major surface 38 in the form of an inverted cone or parabola and is centered about an axis A. For example, the cone may have an apex 86 located between the upper and lower major surfaces 36, 38 (wherein the apex 86 extends deepest into the thickness of the optical body 74) and side walls 88 that extend between the apex 86 and a circumferential outer boundary 90 on the lower major surface 38. In one implementation, the inverted cone extends more than half way through the thickness of the body 74—e.g., where the total thickness of the body is 3-5 millimeters, the apex 86 could be located approximately 0.5 millimeters from the upper major surface 36 (e.g., between 0.4-0.6 millimeters). The position of the apex 86 can have an impact on the performance of the first reflective feature 80, as its position affects the distance light from the light source 56 travels before first striking the reflective feature 80; thus, it may be desirable to correlate the position of the apex with one or more focal lengths, for instance. In at least one embodiment, a diameter of the circumferential outer boundary 90 is at least 2:1 the thickness of the optical body 74 so that the first reflective feature 80 is large enough to collect a majority of light emitted from the light source 56; in a different embodiment, that same ratio is at least 3:1. The side walls 88 may have any suitable shape or configuration when viewed in section, such as in FIG. 5, including configurations with linear segments, curved segments, parabolic segments and/or some combination thereof.

In addition, the relative steepness of the side walls 88 may be uniform or it may vary along its length. For example, FIG. 5 illustrates lower and upper sections (I and II, respectively), wherein at least a portion of the side walls 88 of section II (nearer the apex 86) are steeper than at least a portion of the side walls 88 of section I (nearer the boundary 90). The relative steepnesses of sections I and II may be configured so that oblique rays (e.g., received through surface 36 from the LED 56) strike the side walls 88 at angles that cause total internal reflectance within the optical body 74. In general, light rays from the LED 56 are parallel to axis A; upon striking feature 80, the light rays are reflected outwardly away from feature 80 in a variety of directions within the optical body 74. In this way, the first reflective feature 80 is able to change or redirect the incoming light so that it can enter the optical body 74 through a major surface 38 but it can exit the optical body 74 through a minor surface 40. Because light rays from LED 56 will sometimes diverge—e.g., see angle α, which in one embodiment is approximately 70°—it is desirable to provide a sufficiently sized outer boundary 90 so that at least 80% of the light from the LED impinges or strikes the first reflective feature 80 (i.e., impinges the feature somewhere within the outer boundary 90). As discussed below, the more light that impinges on feature 80, the higher the internal reflectance and, hence, the efficiency of the illumination device 30.

While straight side walls 88 may be used in some embodiments, curved and even parabolic side walls may improve internal reflectance performance. According to one possibility, the lower major surface 38—or at least the portion of the lower major surface that falls within outer boundary 90 or is proximate thereto—can have a suitable reflective coating 94 to further promote internal reflectance of the light rays within the optical body 74. Coating 94 may include metal (i.e., a metallized surface) or some other suitable reflective material. Other configurations and/or materials may be used for the first reflective feature 80, the second reflective feature 82 or both to improve or at least control their reflective performance.

Figure 6:
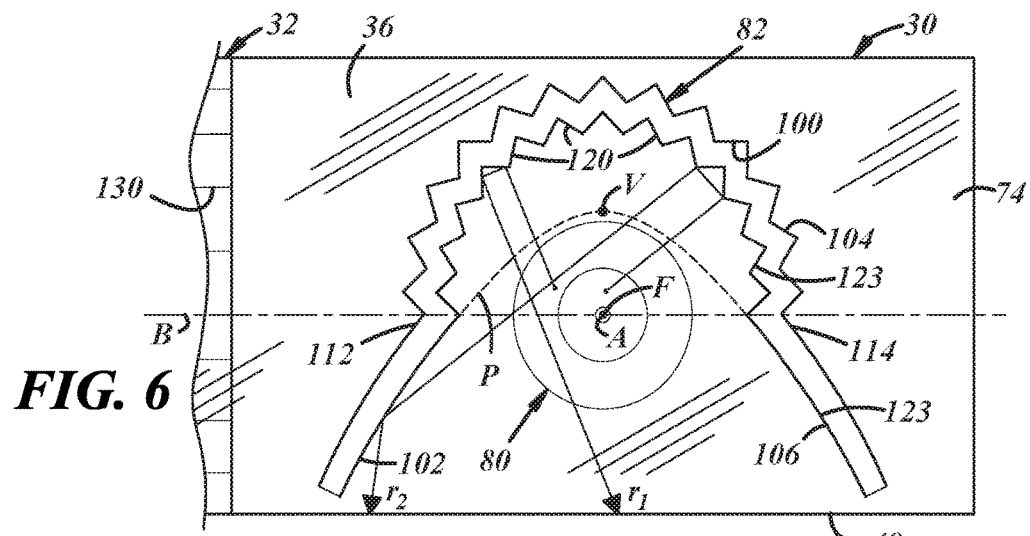
FIG. 6 is a top view of one of the illumination devices shown in FIG. 2.

The second reflective feature 82 is a reflector formed in the first illumination device 30 behind the first reflective feature 80 and is designed to receive light from feature 80 and to reflect it within the optical body 74 towards the minor or edge surface 40, where the light exits the device and illuminates an intended area. As best shown in FIGS. 3 and 6, the second reflective feature 82 may include an arcuate channel 100 that is formed into the upper major surface 36 and extends down into the thickness of the optical body 74 towards the lower major surface 38. In at least one embodiment, the channel 100 includes a first curved arm portion 102, a head or central portion 104, and a second curved arm portion 106—contiguously arranged so that the arm portions 102, 106 are nearer the light-exiting edge surface 40. The arm portions 102, 106 may form parts or segments of a generally parabolic shape P and, if the arm portions do form such a parabolic shape P, then a focus F of the parabola may be coincident or nearly coincident with axis A. In this manner, the geometries of the two reflective features 80, 82 may be correlated to one another so that light rays internally reflected by the first reflective feature 80 to the second reflective feature 82 can then be internally reflected by the second reflective feature 82 towards the edge surface 40. According to one potential embodiment, the light rays reflected by the second reflective feature 82 are at least partially collimated at the arm portions 102, 106—e.g., to form a beam to illuminate the region of interest 20 behind the vehicle. In FIG. 6, transition regions 112, 114 are located where each of the arm portions 102, 106 meets or adjoins the central portion 104, respectively. Further, transition regions 112, 114 can be located at or near a longitudinal centerline of the optical body 74 (e.g., which may coincide with axis B); however, this is not required. As best shown in FIG. 6, axes A and B may intersect in at least some embodiments. Again, the aforementioned geometries and configurations are only meant to serve as examples and are not meant to limit the design of the first illumination device 30, as they are only optional and are not mandatory.

The central portion 104 may include a number of facets or segments 120 that are connected in a zigzag or sawtooth manner and are arranged in a curve or arc to promote the desired reflection within the optical body 74. In at least one embodiment, the central portion 104 is a semi-circular or U-shaped arc that includes a number of linear sawtooth segments and extends outward, beyond the expected path of the parabolic shape P, so as to enclose or surround a vertex V associated with that parabolic shape. Light rays that impinge or strike the different facets 120 of the central portion 104 are reflected such that they ultimately are directed towards the edge surface 40. For example, the central portion 104 may act as a retroreflector—i.e., a reflector arranged so that a light ray having a first direction is reflected off of a facet 120 and is redirected back along a vector that is generally parallel to the first direction but is in a second, opposite direction. Thus, some light rays (e.g., r1) may be reflected directly towards the edge surface 40, whereas other light rays (e.g., r2) may be reflected toward one of the arm portions (e.g., 102) and thereafter be redirected toward the edge surface 40. Although the arrangement and configuration of the second reflective feature 82 can vary, the embodiment shown in the figures is designed to direct light out of the minor or edge surface 40 in both a collimated fashion (e.g., light that reflects off of the first and second curved arm portions 102, 106) and in a non-collimated fashion (e.g., light that reflects off of the central sawtooth portion 104).

In at least one embodiment, the channel 100 is a groove or channel that extends for at least two-thirds of the thickness of the optical body 74 (i.e., two-thirds of the distance between the upper and lower major surfaces 36, 38). The deeper the channel 100, the more light that is likely reflected by the second reflective feature 82. However, providing a channel 100 that is too deep can potentially affect the rigidity and strength of the optical body 74—e.g., a channel 100 that is roughly two-thirds of the depth of the optical body 74 appears to satisfy both reflection and strength requirements for vehicle applications. However, this channel depth is not required. The channel 100 may be formed in the upper major surface 36 and extend downwards towards the lower major surface 38, as its illustrated in FIGS. 3, 4, or vice-versa it may be formed in the lower major surface 38 and extend upwards towards the upper major surface. In the preceding examples, the channel 100 may be formed in the optical body 74 by a molding, milling, machining and/or other manufacturing process.

It should be appreciated that both the first and second reflective features 80, 82 may utilize the phenomena of total internal reflection (TIR) to redirect light within the first illumination device 30. When light rays within the optical body 74 strike an interface at the first or second reflective features 80, 82 (i.e., the interface between the material of the optical body 74 and the surrounding air) at an angle that is greater than a critical angle, with respect to the normal at the boundary surface, total internal reflection occurs so that the light is completely reflected back within the optical body. Moreover, the indices of refraction of the two mediums that define that interface (i.e., the indices of refraction of the optically transparent material of the optical body 74 and that of air) impact the critical angle according to Snell's law, such that care should be taken to select appropriate materials with suitable optical characteristics. To illustrate using the example of the second reflective feature 82, light that strikes a boundary or interface 123 of the channel 100 at an angle greater than the critical angle of that interface will totally internally reflect back into the optical body 74 and likely be directed towards other segments of the central portion 104, the curved arm portions 102, 106 or the edge surface 40.

At least part of the minor or edge surface 40 where light exits the first illuminating device 30 (FIG. 3) may have one or more optics or optical features 124. For example, edge surface 40 may have one or more so-called flutes arranged as a Fresnel lens or the like for redirecting light that exits the optical body 74. In the illustration of FIG. 3, the flutes 124 extend at least partially between the upper and lower major surfaces 36, 38. In vehicle implementations, the flutes 124 further may collimate the exiting light and/or change the light's direction. For example, axis A may not be coincident with a vehicle centerline; therefore, it may be desirable to direct a beam of collimated light toward the vehicle centerline (e.g., shift or direct the beam right or left, e.g., rather than straight backwards behind the vehicle 14). This is merely one example; for instance, the light could also be directed at least partially upwardly or downwardly as well (e.g., downwardly towards the ground below the vehicle 14).

In at least some of the illustrated embodiments, the optical body 74 extends in one direction along axis B to include a second illuminating device 32. For example, in the vehicle environment shown in FIGS. 1-4, the second illuminating device 32 is configured to illuminate the license plate region 16. The lower major surface 38 of the second device 32 may have one or more optics or optical features 130 molded or machined thereon (FIGS. 3-4). For example, the features 130 may include corrugations, flutes, pillows, Fresnel features, or the like which in at least one embodiment can be generally parallel to axis B. The spacing between the optical features 130 may vary; and the embodiment shown in FIGS. 3-4 is merely one example as others exist. When light is received via the upper major surface 36 of the second illumination device 32 (e.g., via LED 58), these optical features 130 can be adapted to redirect and/or collimate light that exits the lower major surface 38 of the second device 32—thereby illuminating the license plate region 16. The second device 32 is optional and thus is not required; and as explained below, the second device 32 may differ in other embodiments.

During manufacture of the illumination assembly 10, the circuit card assembly 28 may be located within the housing 26 so that the stakes 50 protrude through the holes 64 thereof, and the assembly 28 may be retained by welding the tips 66 of the stakes 50 to the PCB 54. The illumination devices 30, 32 may be located within the counterbore 52, and the light sources 56, 58 on the bottom side 70 of PCB 54 may be adjacent or nearly adjacent to the upper major surface 36 of the optical body 74. More specifically, LED 56 may be centered along axis A, and LED 58 may be located in a central region 131 of the second device 32 (FIG. 3). Once in position, the optical body 74 may be welded, adhered and/or otherwise secured in place about a periphery 132 of the upper major surface 36 thereof. For example, a vibration welding technique may be used which oscillates a local region of the illumination devices 30, 32 (e.g., at the periphery 132) and the oscillation partially melts the optical body periphery 132 so that it bonds to the housing 26. In this manner, a circumferential seal may be formed between the housing 26 and devices 30, 32—thereby sealing the circuit card assembly 28 and its components therein.

During operation of the first illumination device 30, light from the light source 56 enters the illumination device through the upper major surface 36 and along axis A. The light then travels within the optical body 74 along axis A until it impinges the first reflective feature 80, at which point the light reflects off of the surfaces of the inverted cone (e.g., side walls 88) and is directed back into the optical body 74 in an omnidirectional fashion (the precise direction of each reflected light ray is influenced by the angle of incidence, the exact spot on the first reflective feature 80 where the light impinges, as well as other factors). Some of the omnidirectionally reflected light (a first portion) will be directed to the edge surface 40 and exit the device 30 without ever encountering the second reflective feature 82; some of the omnidirectionally reflected light (a second portion) will be directed to the first and second curved armed portions 102, 106 of the second reflective feature 82 and will then reflect off of those portions and be directed to the edge surface 40 and exit the device 30 in a collimated fashion; and some of the omnidirectionally reflected light (a third portion) will be directed to the central portion 104 of the second reflective feature 82 and may then reflect off of a number of faceted segments 120 before being directed to the edge surface 40 and exiting the device 30 (if light rays from this third portion strike the curved arm portions 102, 106 before exiting they too will be collimated, if not then they will probably not be collimated). Other portions of the light that reflects off of the first and/or second reflective features 80, 82 may follow different reflective paths. The illumination assembly 10 is arranged so that the overwhelming majority of the incident light from the light source 56 will fall upon some surface of the first reflective feature 80, after which the light will totally internally reflect within the optical body 74 and change directions before eventually exiting the illumination device 30 at the edge surface 40. In this way, the light from the light source 56 starts off along axis A (substantially normal to major surfaces 36, 38) but changes directions within the first illumination device 30 before exiting at the edge surface 40 (substantially parallel to major surfaces 36, 38) and illuminating a region of interest 20 behind the vehicle. In one embodiment, the first illumination device 30 works in conjunction with a backup camera 22 to illuminate that region.

During operation of the second illumination device 32, light from the light source 58 enters the illumination device through the upper major surface 36 (preferably in the area of the central region 131). The light then travels within the optical body 74 until it impinges the optical features 130, at which point it reflects and/or refracts until so that it can illuminate an area underneath illumination assembly 10, such as a license plate region 16. As discussed above, the second device 32 may differ in some embodiments (e.g., as shown in FIG. 9) and does not have to be an illumination device for lighting up a license plate region 16. For example, the second device 32' may be an illumination device for a vehicle door handle or some other interior or exterior vehicle component. Or the second device 32' could be a non-illumination device such as a camera (e.g., a backup camera), an emitter or emitting device (e.g., an infrared illuminator or pointer), a sensor or sensing device (e.g., a proximity sensor, a motion sensor, or the like), etc. These are merely examples; other implementations of the second device 32' are also possible. In one example, the first device 30 is an illumination device for lighting up a region of interest 20 behind the vehicle and the second device 32 is a corresponding backup camera that is directed to that same region 20. Again, it is not required that the illumination assembly 10 have both first and second devices 30, 32, as the assembly could just be provided with the first device 30, for example.

Other embodiments also exist. For example, according to one embodiment shown in FIG. 7, the upper major surface 36 of the illumination device 30 may have a focusing feature or optics 140 adapted to focus the light from light source 56 onto the first reflective feature 80. Non-limiting examples of focusing feature 140 include a convex lens or a collimating optic (e.g., a Fresnel lens). In this manner, the amount of light that impinges on the first reflective feature 80 may be increased (e.g., to more than 90%). The focusing feature 140 may protrude at least partially outwardly from the upper major surface 36, it may be at least partially inverted (e.g., extending inwardly into the upper major surface 36), or a combination thereof. Further, the feature 140 may be formed in the mold with the remainder of the optical body 74'; or it may be etched or milled once the optical body is formed and cooled. It should be appreciated that while this embodiment is shown with the implementation illustrated in FIG. 7, it could be used in combination with any other embodiment. Similarly, any and all embodiments described herein may be used with one another or their equivalents. Further, it should be understood that like reference numerals in FIGS. 7 and 8 indicate identical or like features or functions.

Figure 7:
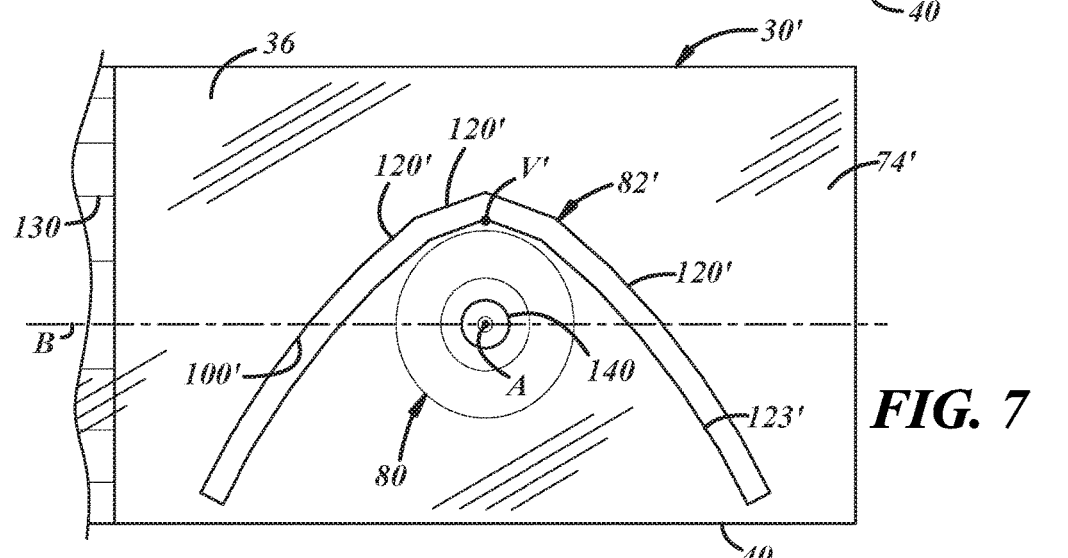
FIGS. 7-8 are top views of other embodiments of one of the illumination devices shown in FIG. 2.
Figure 8:
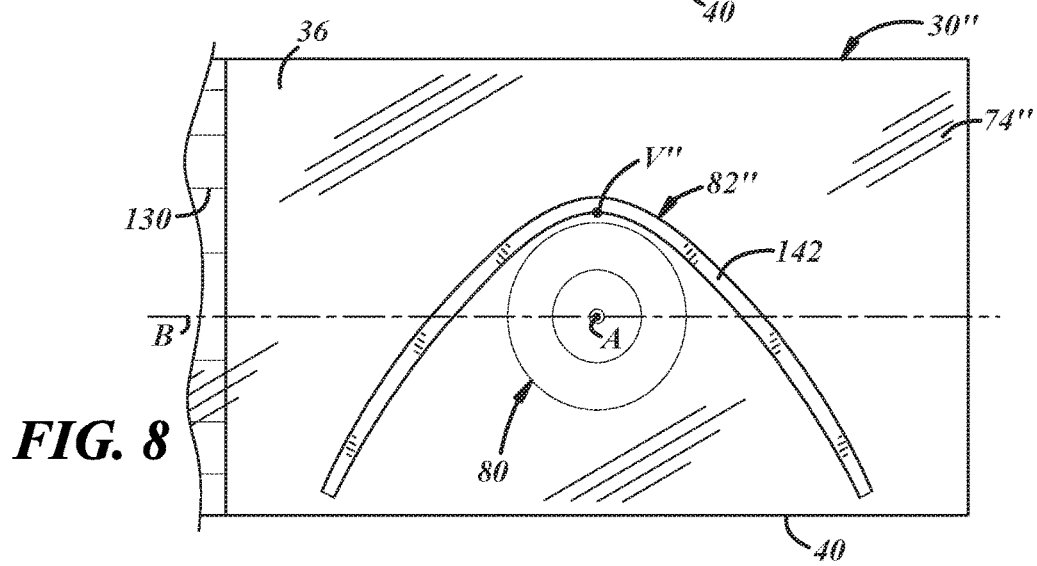

In FIG. 7, the second reflective feature 82' includes an arcuate channel 100' at least partially comprised of a number of curvilinear segments 120' which together form a generally parabolic shape rather than a sawtooth or zigzag shape. In FIG. 8, the second reflective feature 82" is an actual reflective insert 142. For example, a parabolic insert comprised of metal, plastic, etc. may be formed within the optical body 74" via an injection molding process, wherein the optical body 74" is formed in a mold around the reflective insert 142. The insert 142 may function similarly to the arcuate channel described above, but instead of being a groove or channel that uses an interface between the optically transparent material and air and principals of total internal reflection, the insert 142 is simply made of a reflective material (e.g., a reflective metal) that reflects the light back into the optical body. In both the channel embodiment (FIGS. 2-4, 6, 7) and the reflective insert embodiment (FIG. 8), the second reflective feature includes a "reflector," albeit different types.

Thus, there has been described an illumination assembly that includes one or more illumination device(s) having an optical body with a first major surface and a second major surface—a first reflective feature located at the second major surface and a second reflective feature positioned at least partially between the first and second major surfaces. When light from a light source is received at the first reflective feature, it may be internally reflected within the optical body and then internally reflected again via the second reflective feature so that it exits the optical body via a minor or edge surface. The assembly may include other components as well—e.g., a housing, a circuit card assembly that carries at least one light source, or a combination thereof. In addition, other devices may be used in combination with the illumination device. For example, one non-limiting implementation includes another illumination device that is formed in the same optical body as the first illumination device and that has light-directing features on the second major surface.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An illumination assembly, comprising:
a housing;
a light source mounted within the housing; and
an illumination device mounted adjacent the light source, the illumination device includes an optical body comprising a single unitary piece of optically transparent material and includes:
a first major surface;
a second major surface that is separated from the first major surface by a thickness of the optical body;
an edge surface that extends between the first and second major surfaces;
a first reflective feature that includes a recess with one or more side walls that extend from an outer boundary at the first major surface or the second major surface into the thickness of the optical body; and
a second reflective feature that includes a curved reflector, the curved reflector at least partially surrounds the first reflective feature in the optical body and extends from the first major surface toward the second major surface or the second major surface toward the first major surface, wherein the second reflective feature extends only partially into the thickness of the optical body, wherein the first reflective feature and the second reflective feature are both formed in the single unitary piece of optically transparent material of the optical body, wherein the second reflective feature includes a curved reflector in the form of a channel formed into at least one of the first or second major surfaces so that an air interface causes total internal reflectance within the optical body, wherein at least a portion of the channel follows an expected path of a parabolic shape (P) that includes a focus (F) that corresponds with an apex of the first reflective feature, wherein the expected path of the parabolic shape (P) includes a vertex (V) that is enclosed or surrounded by the channel;
wherein the illumination assembly is arranged with the light source facing the first major surface so that light emitted from the light source enters the optical body at the first major surface, reflects off of at least one of the first and second reflective features, and exits the optical body at the edge surface.

2. The assembly of claim 1, wherein the first reflective feature is an inverted cone with an apex, one or more side walls, and a circumferential outer boundary, wherein the apex extends deepest from the first major surface into the thickness of the optical body and is located at a center of the first reflective feature.

3. The assembly of claim 2, wherein at least a portion of one or more of the one or more side walls are parabolic.

4. The assembly of claim 2, wherein at least a portion of one or more of the one or more side walls are curvilinear.

5. The assembly of claim 2, wherein one or more of the one or more side walls include a first section (I) that includes the outer boundary and a second section (II) that includes the apex, wherein a portion of one or more of the one or more side walls in the second section (II) is provided with a steeper slope relative to the first major surface than a portion of one or more of the one or more side walls in the first section (I).

6. The assembly of claim 2, wherein the apex is spaced from the first major surface.

7. The assembly of claim 2, wherein at least a portion of one or more of the one or more side walls is metalized.

8. The assembly of claim 1, wherein the second reflective feature includes a first curved arm portion, a central portion connected to the first curved arm portion, and a second curved arm portion connected to the central portion, and wherein the central portion is configured to reflect light within the optical body and the first and second curved arm portions are configured to collimate light out of the optical body.

9. The assembly of claim 8, wherein the central portion includes a plurality of sawtooth or zigzag segments connected to one another.

10. The assembly of claim 8, wherein the first and second curved arm portions are at least partially parabolic.

11. The assembly of claim 1, wherein the optical body is a parallelepiped and the thickness of the optical body is between 2-5 mm, inclusive.

12. The assembly of claim 1, wherein the optical body is comprised of a molded plastic and includes at least one of acrylic or polycarbonate.

13. The assembly of claim 1, wherein the light source is aligned with the first reflective feature along an axis A so that at least 80% of the light emitted from the light source impinges upon the first reflective feature.

14. The assembly of claim 1, wherein a ratio of a diameter of the outer boundary to the thickness of optical body is at least 2:1.

15. The assembly of claim 1, wherein the second reflective feature includes a curved reflector in the form of a reflective insert molded into the optical body so that the reflective insert reflects light within the optical body.

16. The assembly of claim 1, further comprising a circuit card assembly that carries the light source, wherein the light source is a light-emitting diode (LED).

17. The assembly of claim 1, further comprising a second illumination device formed in the same optical body as the first illumination device, wherein the second illumination device includes a plurality of optical features formed on the second major surface for illuminating a vehicle license plate with a second light source.

18. The assembly of claim 1, further comprising a camera or a sensor.

* * * * *